United States Patent

Iwamura et al.

[19]

[11] Patent Number: 5,904,180

[45] Date of Patent: May 18, 1999

[54] PRESSURE CONTROL DEVICE INTEGRAL FORMED THE ELECTRIC CONTROLLER

[75] Inventors: Moritaka Iwamura; Toshihiro Hamada; Hiromitsu Ogino, all of Hamakita, Japan

[73] Assignee: Nisshinbo Industries Inc., Tokyo, Japan

[21] Appl. No.: 08/778,719

[22] Filed: Dec. 27, 1996

Related U.S. Application Data

[63] Continuation of application No. 08/412,693, Mar. 29, 1995, abandoned.

[30] Foreign Application Priority Data

Aug. 9, 1994 [JP] Japan .................................... 6-208133

[51] Int. Cl.⁶ ..................................................... F16K 11/20
[52] U.S. Cl. ..................................... 137/884; 251/129.15
[58] Field of Search ......................... 137/884; 251/129.15

[56] References Cited

U.S. PATENT DOCUMENTS

| | | | |
|---|---|---|---|
| 4,929,038 | 5/1990 | Reinhartz et al. | 137/884 |
| 5,152,322 | 10/1992 | Maas et al. | 137/884 |
| 5,275,478 | 1/1994 | Schmitt et al. | 137/884 |
| 5,449,227 | 9/1995 | Steinberg et al. | 251/129.15 |

FOREIGN PATENT DOCUMENTS

| | | |
|---|---|---|
| 41 00 967 A1 | 7/1992 | Germany . |
| 41 33 641 A1 | 4/1993 | Germany . |

*Primary Examiner*—John Fox
*Attorney, Agent, or Firm*—Nikaido, Marmelstein, Murray & Oram LLP

[57] ABSTRACT

The object of this invention is to decrease the ratio of contact faults by way of releasing the physical stress acted on the electric connecting portions. It settles dispersions of positions of the terminals by using elasticity of the bushing (50) with being attached the bushing (50) to the body (21) of coil unit (20), being held to be pierced terminals (23, 23) extended from the coil (22) out the bushing (50). The flexibility of the conductive sheet (40) gets rid of stress acted on the connecting portions with the terminals (23) by being electrically intermediated with the flexible conductive sheet between each terminal (23, 23) of the coil (22) and the controlling board (32) of the electric controlling unit (30).

3 Claims, 7 Drawing Sheets

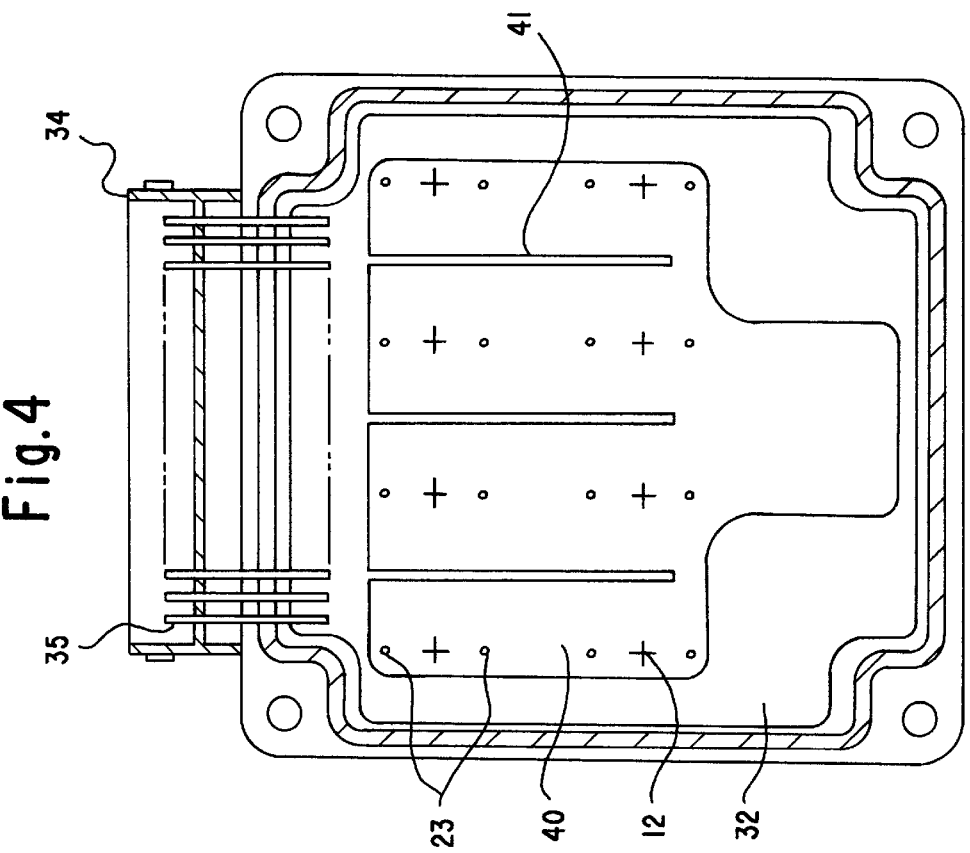
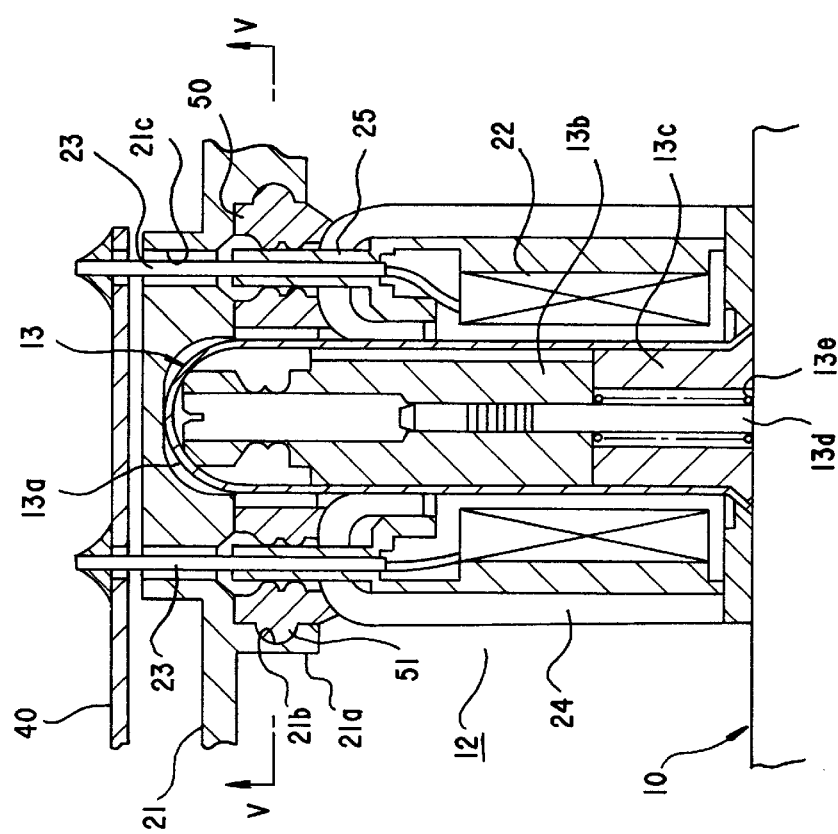

PRESSURE CONTROL DEVICE INTEGRAL FORMED THE ELECTRIC CONTROLLER

This application is a continuation of application Ser. No. 08/412,693 filed Mar. 29, 1995, now abandoned.

BACKGROUND OF THE INVENTION

The present invention relates to a pressure control device. In detail, the present device is a pressure control device which is integrally formed with an electric controller and which may be used with an antilocking braking system (ABS), a traction control system (TCS) an electronic brake force distribution system (EBD), a suspension control system or a pressure control system for an automatic transmission.

DETAILED DESCRIPTION OF THE INVENTION

A type of pressure control system is disclosed in German Patent Application DE P41 33 641.0. The device in DE P41 33 641.0. comprises a plurality of solenoid valves 101, as shown in FIG. 11, and a hydraulic unit 102.

The solenoid valves 101 comprise pressure control valves 103 and cylindrical coils 104. The pressure control valves 103 are secured to the hydraulic unit 102 and the cylindrical coils 104 are attached to the outer side of the pressure valves.

To get high efficiency in assembling the valves, numerous coils 104 are encased in plastic material 106 molded within the body 105. Each coil 104 is attached to the outside of each of the pressure control valves 103 by installing the body 105 onto the hydraulic unit 102. Numerous solenoid valves 101 are assembled at the same time.

The terminals 107 on each solenoid valve 101 extend through the body 105 and are pivotally connected to the controlling circuit board 108 with solder 109.

Another method of electrically joining the controlling circuit board to the terminal coils is disclosed in German Patent Application DE P41 00 967.3.

Conventional pressure control devices have suffered from the following problems.

1. The terminals 107 of the coils 104 are directly connected with the controlling circuit board 108 causing failure in electric contact to occur. Stress (tension force) acts on the connected portions between the terminals 107 and the controlling circuit board 108 so as to disperse the fixed positions of the coils 104 and the pressure control valves 103.

2. The molding of the plastics material 106 raises the cost of assembling of coils but also is disadvantageous in that the plastics material causes the total weight of the parts to gain the weight of the plastic material 106.

3. The method of connecting has the added disadvantage of allowing faults in electric contact due to the occurrence of stress to the connection between the terminals and controlling circuit board.

4. If the system is electrically connected by a short wire harness or through conduction material located in the body between the terminals of each solenoid valve and the controlling circuit board, the system suffers from low reliability in the electric connections. These methods only increased the number of connections but also increase the probability of faults in the connection.

THE OBJECT OF THE INVENTION

The object of this invention is to provide a pressure control device which is integrally formed with the electric controller and which can be attached to the coils and constructed with the solenoid valves reliably and easily.

In addition, an object of the present invention is to prevent the disruption in electric connections, caused by the stress that acts on the portion of the connections by the terminals of the solenoid valves, by means of releasing stress.

In addition, an object of this invention is to reduce the weight and cost of the pressure control device.

In addition, an object of this invention is to improve the waterproof character of the pressure control device.

The claimed pressure control device is integrated with an electric controller and has a hydraulic unit installed with a plurality of pressure control valves. The coil unit is constructed with a plurality of coils and solenoid valves by attaching the coil units to the outside of the pressure control valves. A controlling circuit board for controlling pressure by actuating the solenoid valves is characterized in that annular bushings are attached to the body of the coil unit and the terminals extend from coils and are held elastically by piercing through the bushings.

Further, the controlling circuit board of the pressure control device is provided for controlling pressure by actuating the solenoid valves, characterized in that each terminal extending from the coil is in electrical contact with the conductive sheet so as to be flexible.

Further, the controlling circuit board for controlling pressure by actuating the solenoid valves is characterized in that annular bushings are attached to the body of the coil unit and the terminals extend from the coils and are held by piercing through the bushings, each terminal extends from the coil and is in electrical contact with the conductive sheet so as to be flexible.

Further, annular projections may be formed around the terminals that are in elastic contact the bearings of the bushings and are pierced through the terminals of the coils.

Further, the pressure control device is characterized in that the thickness of the bushing is such so as to push the coils to the hydraulic unit.

Further, the pressure control device is characterized in that a projection, being integrally formed on the outer surface of the bushings, is provided. The body of the coil unit being made with a depression corresponding to the projections and the projection is coupled with the depression to attach the bushing to the coil unit.

Further, the pressure control device is characterized in that the conductive sheet is separated into pieces so as to form a cut or cuts on the conductive sheet and each piece of sheet is electrically contacted with each terminal of the coil.

Further, the pressure control device is characterized in that a plurality of supporting elements are disposed inside of the electric control unit (ECU) body. Each supporting element extending through to the controlling circuit board. Damping materials are interposed between the top of the supporting element and the controlling circuit board. The controlling circuit board is elastically supported.

Further, the pressure control device is characterized in that a connector is coupled with the controlling circuit board. Elastic materials with sealing function coat the outer surface of the connector. The opened portion of the electric controlling unit is closed around the connector mounted on the elastic materials.

The benefits of this invention as above are as follows:

1. As the operation of only pushing the terminals to the bushing can be attached to the coil body, the coils constructed with the solenoid valves can be fastened easily and reliably; and 2. Even if there are variations in the installation position of the pressure control valves, which are constructed with the solenoid valves, the elastic character of the bushing can settle these dispersions. Thus, reduction of the stress acts on the terminals of the coils makes it possible to prevent faults in the contacts.

BRIEF DESCRIPTION OF DRAWINGS

The above and other objects and the attendant advantages of he present invention will become readily apparent by reference to the following detailed description when considered in conjunction with the accompanying drawings wherein:

FIG. 3 shows a magnified cross-sectional view of an open solenoid valve;

FIG. 4 shows a cross-sectional view of the coil unit;

DETAILED DESCRIPTION OF THE DRAWINGS

Figure 1:
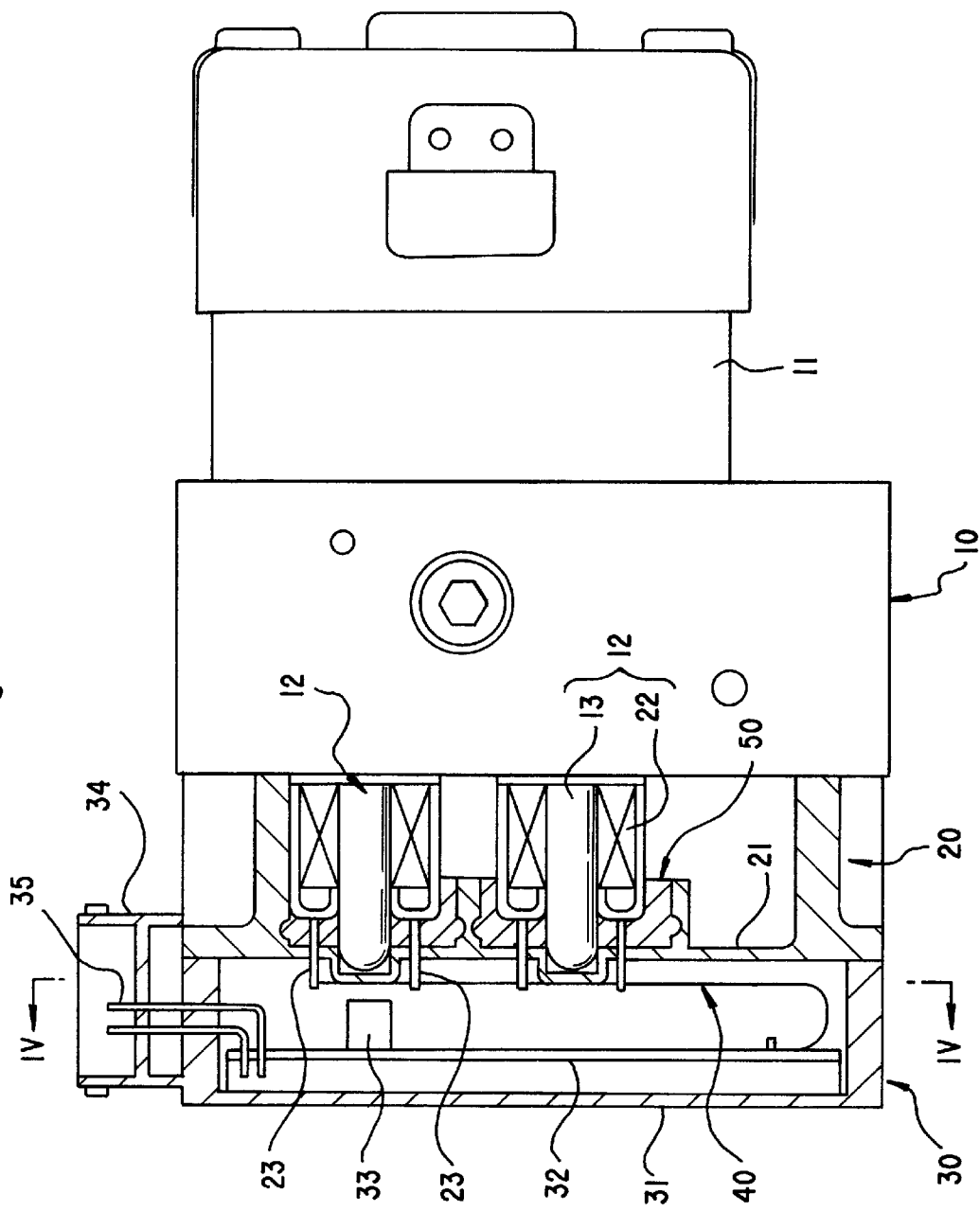
FIG. 1 shows an example of the pressure control device with the integrated electric controlling equipment.

As shown in FIG. 1, the coil unit 20 is comprised of the coil body 21 and a plurality of coils 22 installed within the coil body. The solenoid valves are constructed with coils fixed outside of said pressure control valves. The coil body 21 is made of plastics and attached to the front of the hydraulic unit 10.

The coil 22 is made by winding wire to a bobbin and then molding around the bobbin with resins The terminals 23, 23 are connected with both ends of wire which form the coil 22 and project to the outside through the top of yoke 24 which covers the coil 22.

Figure 2:
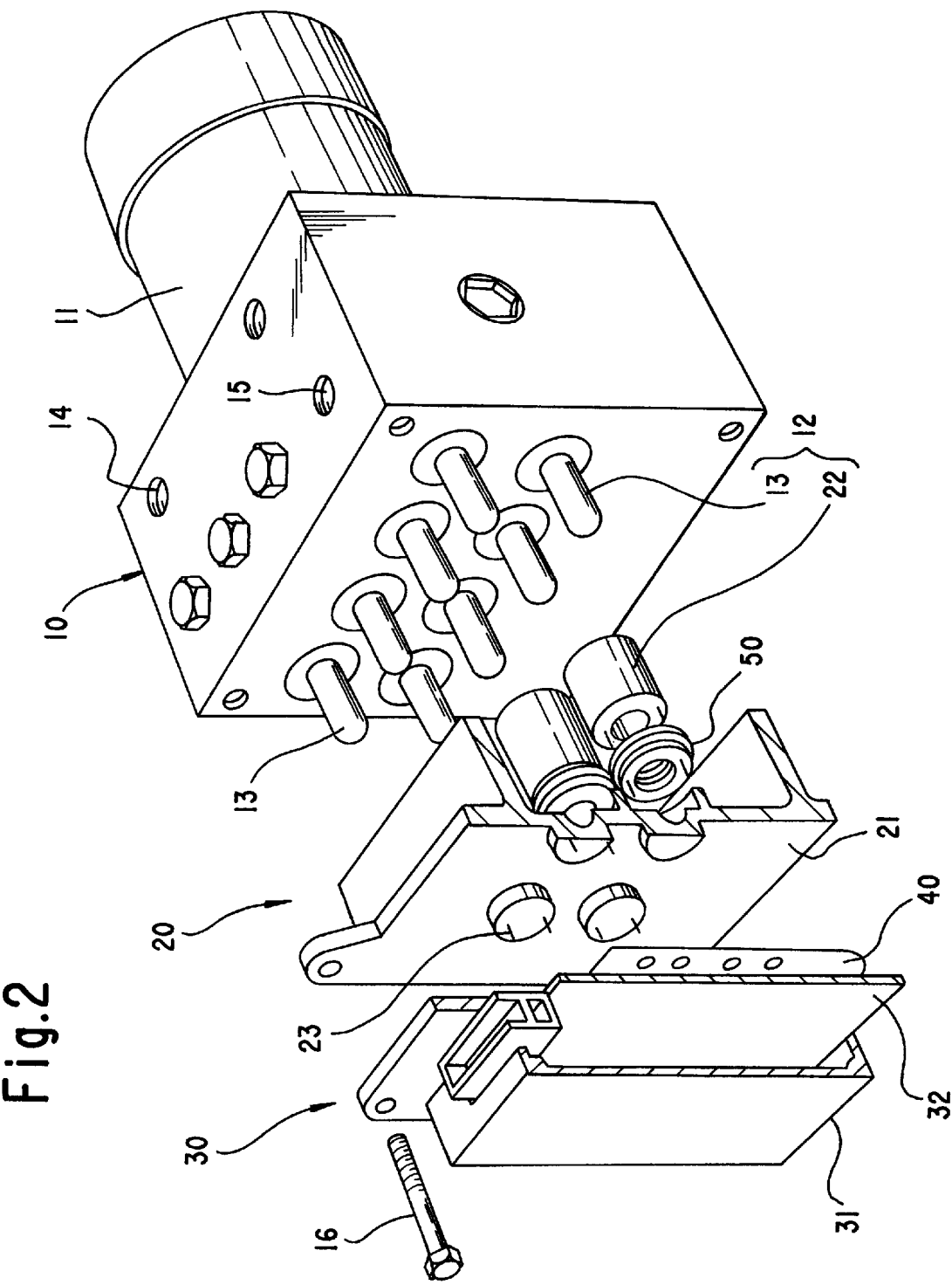
FIG. 2 shows an example for fixing a coil 22 to a coil body 21 by using annular bushing.

FIG. 2 shows an example for fixing a coil 22 to a coil body 21 by using an annular bushing.

Bushing 50 has projections 51 formed in serial or in intervals on the outer surface of the bushing. The projections 51 are coupled with the depressions 21b, which form the blanket 21a of the coil body 21. The bores 52, 52 for which the terminals 23, 23 extend, are made of a plurality of annular projections, which can hold the terminals 23, 23, and are formed inside of the bushing. The bushing 50 compensates for differences in the fixed positions of the sleeve 13 by resiliently pushing the coil 22 toward the hydraulic unit 10.

The electric controlling unit (ECU) 30 is comprised of the electric controlling unit body 31 made from plastics, the electric controlling board 32, inserted into the ECU body 31, and the connector 34 attached to the side of the ECU body 31.

The preferred embodiment will now be described with respect to the drawings.

FIG. 1 shows an example of the pressure control device integrated with the electric controlling equipment.

The electric motor 11 is attached to the back side of the hydraulic unit 10.

A plurality of bores for fixing the solenoid valves 12 are located in the front of the hydraulic unit. The pressure control valves 13, which are constructed with the solenoid valves 12, are inserted into the bores. A hydraulic pump with a plurality of fluid passages is driven by the electric motor 11. A port 14 for connecting to a pipe from a master cylinder is arranged on the upper side of the hydraulic unit 10 with a port 15 for connecting with each wheel.

The coil unit 20 is comprised of the coil body 21, made from plastics, which is attached to the front of the hydraulic unit 10 and has a plurality of the coils 22 attached to the inside of the coil body 21 via bushings 50. The solenoid valves are constructed with the pressure control valves 13 and the coils 22 are positioned onto the pressure control valves 13. The structure of fixing the coils 22 and the electric connection thereof will be described later.

The electric controlling unit 30 is comprised of the electric controlling unit body 31 made from plastics and the electric controlling board 32 attached to the electric controlling unit body 31. The electric controlling board 32 is printed with the controlling circuit and has the electronic parts such as the electronic controller 33 fixed to it.

The exposed connector 34 for contacting from the outer connector is arranged with a part of the side of the ECU body 31. One end of each terminal 35, which can be made of metals, and which has an L-shape, is electrically contacted with the controlling circuit through the controlling circuit board and the other end of each terminal 35 is guided into the connector 34.

The electric control equipment is constructed with the coil unit 20 and the control board 32.

The coil unit 20 and the electric controlling unit 30 are set and fixed to the hydraulic unit 10 with bolts 16.

A flexible sheet 40, which is positioned between a pair of terminals 23, 23 from each of the solenoid valves 12 and the control board 32, is used as the flexible printed circuit board, and has the circuit printed on one side. Both terminals of the conductive sheet 40 and the control board 32 are directly connected with solder. Punched holes in the conductive sheet 40 in correspondence to the terminals 23 of the solenoid valves 12 are utilized such that each terminal 23 and the appropriate points of the circuit on the conductive sheet are electrically connected by inserting the terminals 23 into the punched holes and soldering.

It is preferred to have a plurality of lateral cuts 41 in the conductive sheet 40 as shown in FIG. 4. The conductive sheet with a plurality of notches can get rid of the problem of variations in the positions of the terminals 23, i e. the fixed positions of the solenoid valves, giving more flexibility to the conductive sheet than that of without notches. The conductive sheet is however, able to depend on its self flexibility without notches for satisfactory results. The center line between a pair of terminals shown in FIG. 4 is drawn as a center of solenoid valve.

It will be understood by those skilled in the art that electric wires or connectors as well can used and the present invention is not restricted to only the conductive sheet 40. While it is preferred to use said conductive sheet 40 as a meaning of contact between the terminals 23, 23 of the solenoid valve 12 and the controlling board 32.

FIG. 3 shows a magnified cross-sectional view of the normally open solenoid valve.

The solenoid valve 12 is comprised of the pressure control valve 13 and the cylindrical coil 22. The pressure control valve is constructed with a sleeve 13a shaped like a dome, the armature 13b installed into the sleeve 13a and the magnetic core 13c. The rod 13d is secured in the center of the armature 13b. The armature 13b and the rod 13d are forced so as to open the fluid line by a spring force from the spring 13e. When a current is applied to the coil 22, the excitation force makes the armature 13b and the rod 13d move to close the line.

The coil 22 is produced by winding electric wire round the bobbin and coating it with resin. Being connected to both ends of electric wires the terminals 23, 23 push out through the top of the yoke 24 which covers with the coil 22.

A detailed description of the normally closed valves will be omitted as one of ordinary skill in the art will appreciate that the normally closed valve has the same basic elements as the normally open valve with the only difference being of the direction of opening and closing.

The coil 22 as shown in FIG. 3 is set within the coil body 21 with the annular bushing 50. The bushing 50, which can be made of silicon rubber, is a monoblock formed product like a donut shape and has the functions of supporting the coil 22 holding the coil 22 and sealing the terminals 23, 23 of the coil 22.

Being formed with serial or interval projections on the outer surface of the bushing 50, the bushing 50 is fixed by coupling said projections 51 with the depressions 21b formed in the blanket 21a with the coil body 21. The diameter and the thickness of the bushing 50 are set dimensions so as to be able to elastically push the top of the yoke 24 in the direction of the hydraulic unit 10. Two different diameter bores, a first diameter of bore 52, 52 are for the terminals 23, 23 of the coil 22 and a second diameter bore 54, 54 for engaging the supporting rods 26, 26 of the coil 22, are provided.

Figure 6:
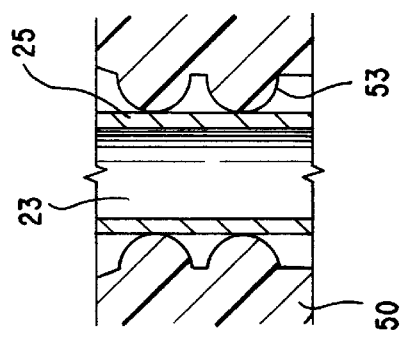
FIG. 6 shows a magnified cross-section of a terminal.

A plurality of annular projections are formed on the inner round face of each bore 52 as shown in FIG. 6. The inner diameter of the annular projections 53 is less in dimension than that of resin covering at the lower half of the terminals 23. The terminals 23, 23 of the coil 22 being are pushed into each bore of the bushing 50 and the pierced bore 21c, 21c located on the coil body 21. The bushing 50 can effectively seal between the bore 52 and the covering resin. The elasticity of the bushing 50 and the annular projections 53 solve the problem of the variations in the fixed positions of the terminals 23.

Figure 7:
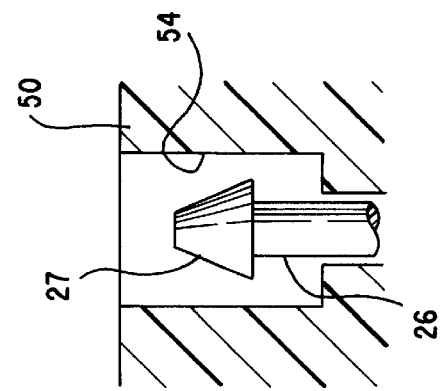
FIG. 7 shows a magnified cross-section of an engaging rod.
Figure 5:
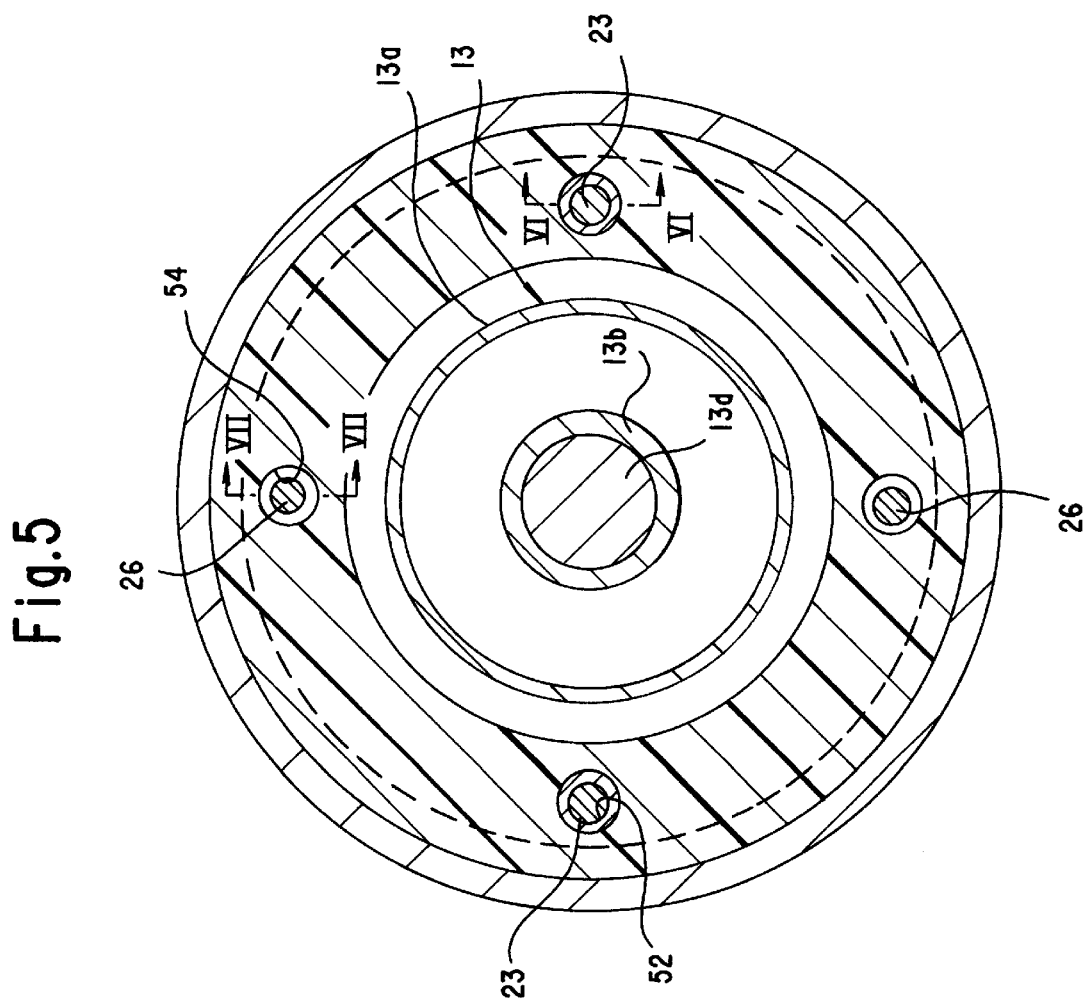
FIG. 5 shows a cross-sectional vie of the magnified cross-sectional view of an open solenoid valve.

Engaging rods 26 are arranged parallel to the terminals 23 for coil 22 as shown in FIGS. 5 and 7. These engaging rods are inserted from a small bore to a different larger bores 54 in the bushing 50. The large diameter 27 on the top end of the engaging rods 26 are engaged to the stepped portion of the different larger bore 54. The coil 22 can fall down to the bushing 50. This mechanical mechanism prevents the coil 22 from dropping off in assembly.

SECOND EMBODIMENT

Figure 8:
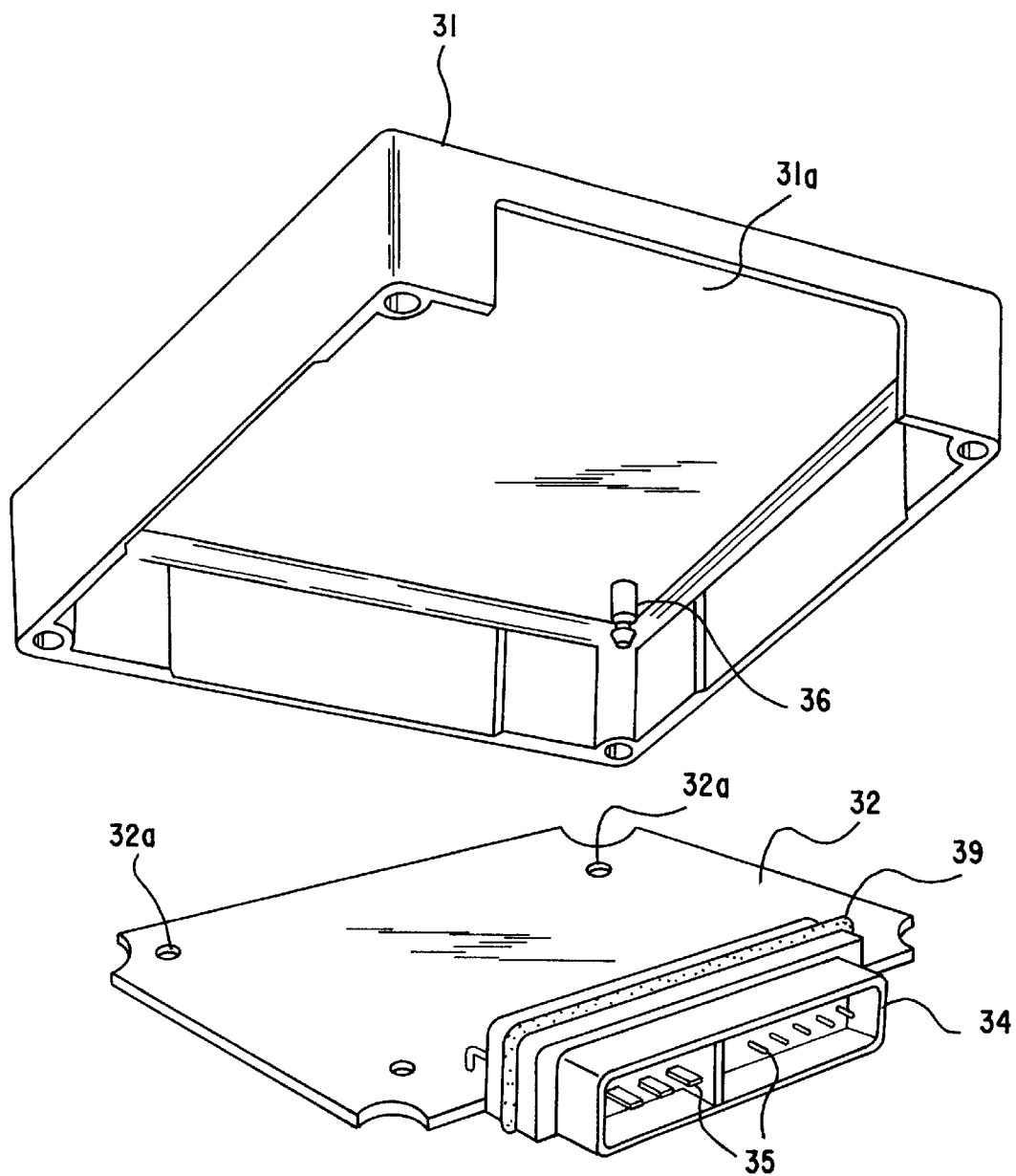
FIG. 8 shows a drawing for the example I of elastically supporting the electric controlling board.
Figure 9:
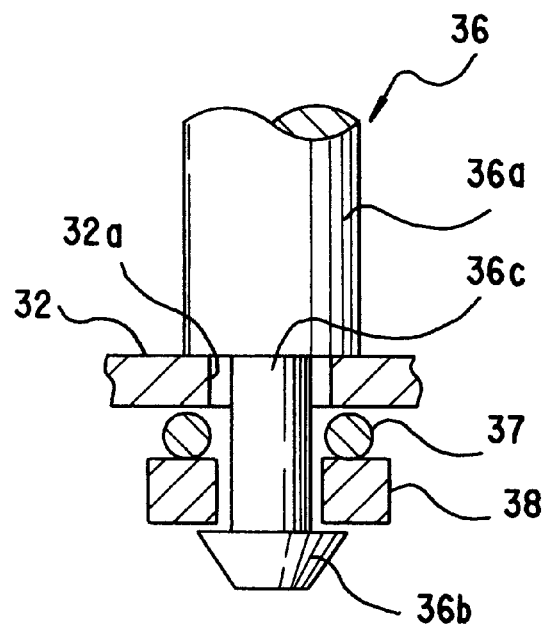
FIG. 9 shows a magnified drawing for the portion of connecting with the electric controlling board to the supporting member via elastic materials.
Figure 10:
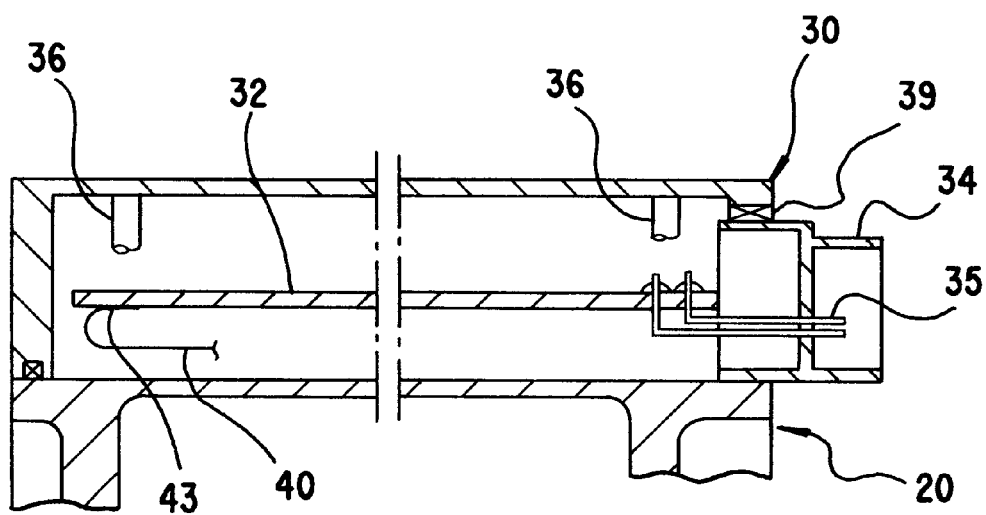
FIG. 10 shows a cross-sectional view drawing for the electric controlling unit.
Figure 11:
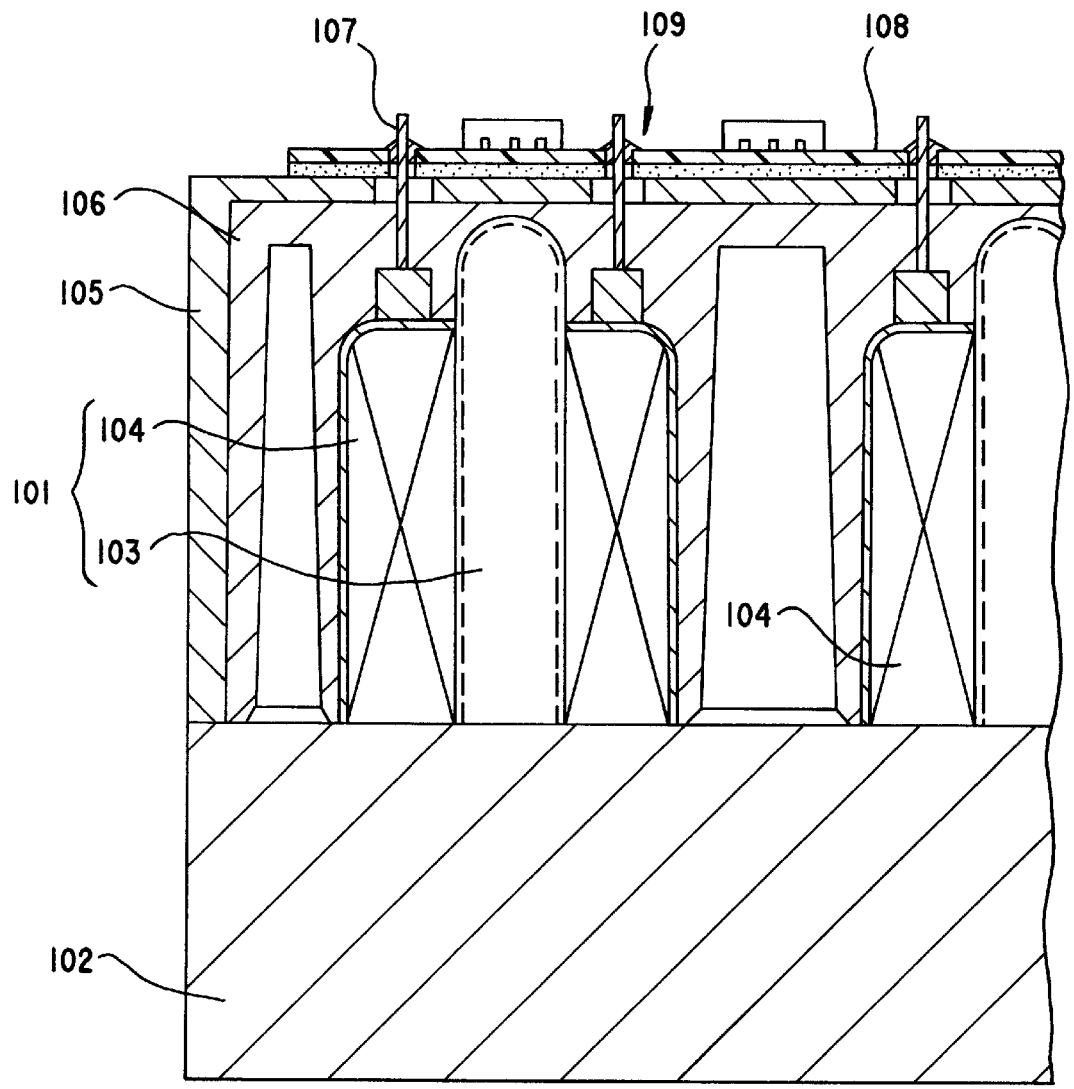
FIG. 11 shows a partial cross sectional view drawing for a conventional pressure control device.

FIGS. 8–10 show another embodiment for elastically supporting the control board 32 in the ECU body 31. The same numbered parts as above will be omitted in the detailed explanations in this description.

FIG. 8 shows the angled view drawing before assembling the controlling board 32 and the ECU body 31. The supporting members 36 are integrated in the ECU body 31 to a plurality of places inside the ECU body 31. Having a cone shaped wedge 36b on the top end of the portion of the shaft 36a as shown in FIG. 9, each supporting member 36 is arranged on a portion of the neck 36c, of which the diameter is smaller than that of the wedge 36b, between the portion of the shaft 36a and the wedge 36b. On the other side, the inner diameter of the bore 32a, which is sized to allow a portion of the wedge 36b to be inserted but prevent a portion of the shaft 36a from passing through, is located at an opposite position to said supporting member 36 in the control board 32. The top end of the supporting member 36 pierces into the bore 32a in the control board 32. Damping materials 37 are ring shaped and set the portion of the neck 36c pushed out to the opposite side. A retaining ring 38 can be interposed between the damping materials 37 and the wedge 36b to support the control board 32 elastically using the elastic force of the damping materials 37.

This has the advantage of releasing the physical stress that acts on the connecting portion 43 of the controlling board 32 and the conductive sheet 40 as shown in FIG. 3.

While supporting the connector 34 to the side of the control board 32 via the connector terminal's L-shaped portion as shown in FIGS. 8 and 10, the connector 34 is assembled such that the damping materials 39 can be also positioned between the internal round open mouth located in the ECU body 31 and the outer side of the connector 34.

This construction can release the physical stress that acts on the portion of the connecting of the controlling board 32 and each terminal 35 of the connector by the elastic force of the damping materials 39.

THIRD EMBODIMENT

While the integral assembly of the coil unit 20 and the electric controlling unit to the hydraulic unit 10 was described in the above examples, it also can be applied to a coil unit 20 assembled only to the hydraulic unit 10 separated from the electric controlling unit 30.

In this case, it is necessary to close the portion of opening in such manner to attach the special lid materials for the hydraulic unit 10 and the coil unit 20.

The separated electric controlling unit 30 is connected with the wire harness and located in a vehicle.

It can also be utilized in the integrate-type one unit to which a coil unit 20 and the electric control unit 30 is assembled.

It is readily apparent that the above-described has the advantage of wide commercial utility. It should be understood that the specific form of the invention hereinabove described is intended to be representative only, as certain modifications within the scope of these teachings will be apparent to those skilled in the art.

Accordingly, relevance should be made to the following claims in determining the full scope of the invention.

We claim:

1. A pressure control device with an integrated electric controller comprising a hydraulic unit having a plurality of pressure control valves, each pressure control valve having an outer surface; a coil unit including a coil body and a plurality of coils, each coil being attached to the outer surface of one of said pressure control valves; and a controlling circuit board for controlling pressure by actuating said plurality of pressure control valves; further comprising:

a plurality of annular elastic bushings, each bushing attaching one of said coils to said coil body, each bushing having at least one bore having an inner surface and annular projections formed on said inner surface of the bore;

a terminal extending from each said coil, each one of said terminals being pierced through one of said bushings and elastically held by the bushing, said annular projections on said inner surface of the bore elastically engaging around said terminal thereby attaching said coil to said coil body.

2. A pressure control device with an integrated electric controller comprising a hydraulic unit having a plurality of pressure control valves, each pressure control valve having an outer surface; a coil unit including a coil body and a plurality of coils, each coil being attached to the outer surface of one of said pressure control valves; and a controlling circuit board for controlling pressure by actuating said plurality of pressure control valves; further comprising:

a plurality of annular elastic bushings, each bushing attaching one of said coils to said coil body, each bushing having at least one bore having an inner surface and annular projections formed on said inner surface of the bore;

terminals extending from said coils and elastically held by piercing through said annular bushings, said annular projections on said inner surface of the bore elastically engaging around said terminal, thereby attaching said coils to said coil body; and a flexible conductive sheet electrically connected to said controlling circuit board;

wherein said terminals extending from said coils are in electrical and flexible contact with said flexible conductive sheet.

3. A pressure control device with an integrated electric controller comprising a hydraulic unit having a plurality of pressure control valves, each pressure control valve having an outer surface; a coil unit including a coil body and a plurality of coils, each coil being attached to the outer surface of one of said pressure control valves; and a controlling circuit board for controlling pressure by actuating said plurality of pressure control valves; further comprising:

a plurality of annular elastic bushings, each bushing attaching one of said coils to said coil body;

a terminal extending from each said coil, each one of said terminals being pierced through one of said bushings and elastically held by the bushing thereby attaching said coil to said coil body a projection integrally formed of an outer surface of each said bushing;

a depression formed in the coil body corresponding to said projection so as to attach said bushing to said coil body by coupling said projection and depression.

* * * * *